(12) United States Patent
Wang

(10) Patent No.: US 9,541,159 B2
(45) Date of Patent: Jan. 10, 2017

(54) CHAIN PLATE STRUCTURE

(71) Applicant: Wen-Pin Wang, Tainan (TW)

(72) Inventor: Wen-Pin Wang, Tainan (TW)

( * ) Notice: Subject to any disclaimer, the term of this patent is extended or adjusted under 35 U.S.C. 154(b) by 127 days.

(21) Appl. No.: 14/556,444

(22) Filed: Dec. 1, 2014

(65) Prior Publication Data
US 2016/0153526 A1 Jun. 2, 2016

(51) Int. Cl.
*F16G 13/02* (2006.01)
*F16G 13/06* (2006.01)

(52) U.S. Cl.
CPC ................... *F16G 13/06* (2013.01)

(58) Field of Classification Search
CPC .......... F16G 13/06; F16G 13/07; F16G 13/02; B62M 9/06; B62M 9/10
USPC .......................... 474/226, 230, 231, 232, 234
See application file for complete search history.

(56) References Cited

U.S. PATENT DOCUMENTS

| | | | | |
|---|---|---|---|---|
| 694,870 A * | 3/1902 | Levalley | ................. | F16G 13/02 305/106 |
| 1,379,896 A * | 5/1921 | Bethke | ................... | F16G 13/07 474/234 |
| 2,359,745 A * | 10/1944 | Butler | ................... | B65G 17/38 198/853 |
| 2,869,380 A * | 1/1959 | Lemmon | ................. | F16G 13/07 474/234 |
| 3,518,892 A * | 7/1970 | Nicholson | ............... | F16G 13/07 474/230 |
| 3,595,011 A * | 7/1971 | Nicholson | ............... | F16G 13/07 59/8 |
| 4,265,134 A * | 5/1981 | Dupoyet | ................. | F16G 13/06 474/231 |
| 4,983,147 A * | 1/1991 | Wu | ......................... | F16G 13/06 474/206 |
| 5,066,265 A * | 11/1991 | Wu | ......................... | F16G 13/06 474/206 |
| 5,226,857 A * | 7/1993 | Ono | ........................ | F16G 13/06 474/231 |
| 5,291,730 A * | 3/1994 | Wu | ......................... | F16G 15/00 474/220 |
| 5,741,196 A * | 4/1998 | Campagnolo | ........... | F16G 13/06 474/206 |
| 5,799,479 A * | 9/1998 | Tanaka | .................... | F16G 13/06 474/206 |
| 6,110,064 A * | 8/2000 | Guichard | ................ | F16G 13/06 474/230 |
| 7,325,391 B1 * | 2/2008 | Oishi | ...................... | F16G 13/06 474/206 |

(Continued)

*Primary Examiner* — Henry Liu
(74) *Attorney, Agent, or Firm* — Rosenberg, Klein & Lee

(57) ABSTRACT

A chain plate structure includes a link plate body and a sleeve. The link plate body has an acting surface being provided with a first approach edge, two combining portions, and a limiting block located adjacent to the first approach edge. The limiting block has an altitude higher than an altitude of the acting surface. The sleeve is mounted on the link plate body and has a through hole whose maximum diameter is greater than a maximum diameter of a raised ring peripherally formed on the corresponding one of the combining portions. Therefore, when two of the link plate bodies are combined together, a first space is formed between the acting surfaces of the two aligned link plate bodies. The limiting block serves to limit the first space, while the sleeve is allowed to move on one of the combining portions so as to provide a second space.

8 Claims, 14 Drawing Sheets

(56) References Cited

U.S. PATENT DOCUMENTS

| | | | | |
|---|---|---|---|---|
| 7,427,251 | B2* | 9/2008 | Reiter | F16G 13/06 474/206 |
| 7,837,584 | B2* | 11/2010 | Wu | F16G 13/06 474/218 |
| 7,946,941 | B2* | 5/2011 | Oishi | F16G 13/06 474/206 |
| 8,517,874 | B2* | 8/2013 | Reiter | F16H 55/30 474/152 |
| 8,734,280 | B2* | 5/2014 | Oishi | F16G 13/06 474/230 |
| 2005/0020394 | A1* | 1/2005 | Valle | B62M 9/00 474/155 |
| 2005/0164816 | A1* | 7/2005 | Wang | F16G 13/06 474/234 |
| 2012/0322599 | A1* | 12/2012 | Oishi | F16G 13/06 474/230 |

* cited by examiner

CHAIN PLATE STRUCTURE

BACKGROUND OF THE INVENTION

1. Technical Field

The present invention relates to bicycle chains, and more particularly to a chain plate structure featuring that when the chain plate structures are assembled as a chain having plural chain elements, two spaces are formed in each said chain element, thereby contributing to steady and fast shifting operation with reduced noise.

2. Description of Related Art

FIG. 15 depicts an example of a conventional chain for bicycle transmission. Therein, a chain (A) routes around a derailleur's guide pulley (B) and a transmission sprocket (C), for allowing transmission and shifting operation. While the chain (A) has its each two aligned chain plates (A1) spaced by a fixed interval, the chain-engaging teeth (B1) of the guide pulley (B) and the chain-engaging teeth (C1) of the transmission sprocket (C) are different in thickness. As a result, it is impossible for the chain-engaging teeth (B1) of the guide pulley (B) and the chain-engaging teeth (C1) of the transmission sprocket (C) to be both fittingly received in the interval between the two aligned chain plates (A1) of the chain (A). Instead, at least one of the two kinds of teeth (B1) (C1) only gets too loose or too tight engagement with the chain (A), and this can adversely affect the efficiency of transmission and shifting operation.

As an attempt to address this problem, Taiwan Patent No. M400969 published on Apr. 1, 2011 and titled "PLATE BODY FOR INNER PLATE AND INNER PLATE HAVING THE SAME" discloses a plate body, wherein the plate body is used for a bicycle chain, which has two of the plate bodies assembled face to face, and serves as an inner plate of the bicycle chain. The plate body comprises a pair of through holes and a raised portion that is defined between the two through holes and faces the other plate body. Therein, the raised portion is equidistant from the centers of the two through holes. Thereby, the chain can be maintained tilted during shifting operation, so as to improve the holding force of the chain exerting on the chain pulley.

However, in the prior patent, the interval between the raised portions of the two aligned chain plates is still fixed, so the problem that at least one of the two kinds of teeth only gets too loose or too tight engagement with the chain remains unsolved and the poor efficiency of transmission and shifting operation persists.

SUMMARY OF THE INVENTION

In view of the shortcomings of the existing chain plates, the present invention provides a chain plate structure that comprises a link plate body and a sleeve. The link plate body has an acting surface. Two opposite ends of the acting surface each have a combining portion, which is provided with an axial hole peripherally formed with a raised ring. The acting surface has a first approach edge and a second approach edge, each individually extends between the two combining portions. The acting surface has a limiting block located adjacent to the first approach edge. The limiting block has an altitude that is higher than an altitude of the acting surface. The sleeve is mounted on one of the raised rings of the link plate body and includes a through hole. The through hole has a maximum diameter greater than a maximum diameter of the raised ring. Whereby, when two of the link plate bodies are combined, a first space is formed between the acting surfaces of the two aligned link plate bodies. The limiting block serves to limit the first space, while the sleeve is allowed to move on one of the combining portions, so as to provide a second space.

Further, the acting surface further has a limiting block located adjacent to the second approach edge.

Further, the altitude of the limiting block is lower than an altitude of the combining portion.

Further, the altitude of the limiting block is equal to an altitude of the combining portions.

Further, the acting surface is provided with a hollowed-out portion that passes through the link plate body.

Further, the acting surface is provided with a depressed portion.

Further, the limiting block is provided with a sunken portion whose altitude is lower than the altitude of the limiting block and is higher than the altitude of the acting surface.

Further, wherein a ramp is formed at a border between the limiting block and the sunken portion and inclines toward a center of the sunken portion.

The present invention has the following advantages:

1. The present invention uses the reduced interval between the two limiting blocks to relatively reduce the first space, so that the chain-engaging tooth, which is relatively thin, of the guide pulley can enter and be fittingly received in the first space fast. Thus, during shifting operation, the guide pulley can displace fast and stably, making the shifting operation smooth.

2. In the present invention, the acting surface near the second approach edge is left open without having the limiting block, so the first space is relatively large and suitable for the chain-engaging tooth, which is relatively thick, of the transmission sprocket to enter and be fittingly received fast. Thus, during shifting operation, the chain can displace fast and stably, making the shifting operation smooth. Also, when the chain reverses, the first space is large enough to receive the chain-engaging tooth of the transmission sprocket, so as to prevent the chain from coming off the sprocket.

3. In the present invention, when receiving pressure coming from the chain-engaging tooth, the sleeves can move on the combining portions by a restricted range, so that the second space, which is smaller than the first space, is formed between the combining portions of the two aligned link plate bodies due to the displacement of the sleeve. Thereby, the tip of the chain-engaging tooth of the transmission sprocket can be fittingly received in the second space. As a result, when moving during shifting operation, the chain can be guided and prevented from swaying, so that noise that may otherwise be generated when the chain hits the chain-engaging tooth can be eliminated.

4. In the present invention, the acting surface of the link plate body is provided with a passing-through hollowed-out portion or a depressed portion, which allows the chain-engaging tooth of the guide pulley or of the transmission sprocket to offset transversely during shifting operation, so as not to deviate and hit the acting surface of the link plate body.

DETAILED DESCRIPTION OF THE INVENTION

Figure 1:
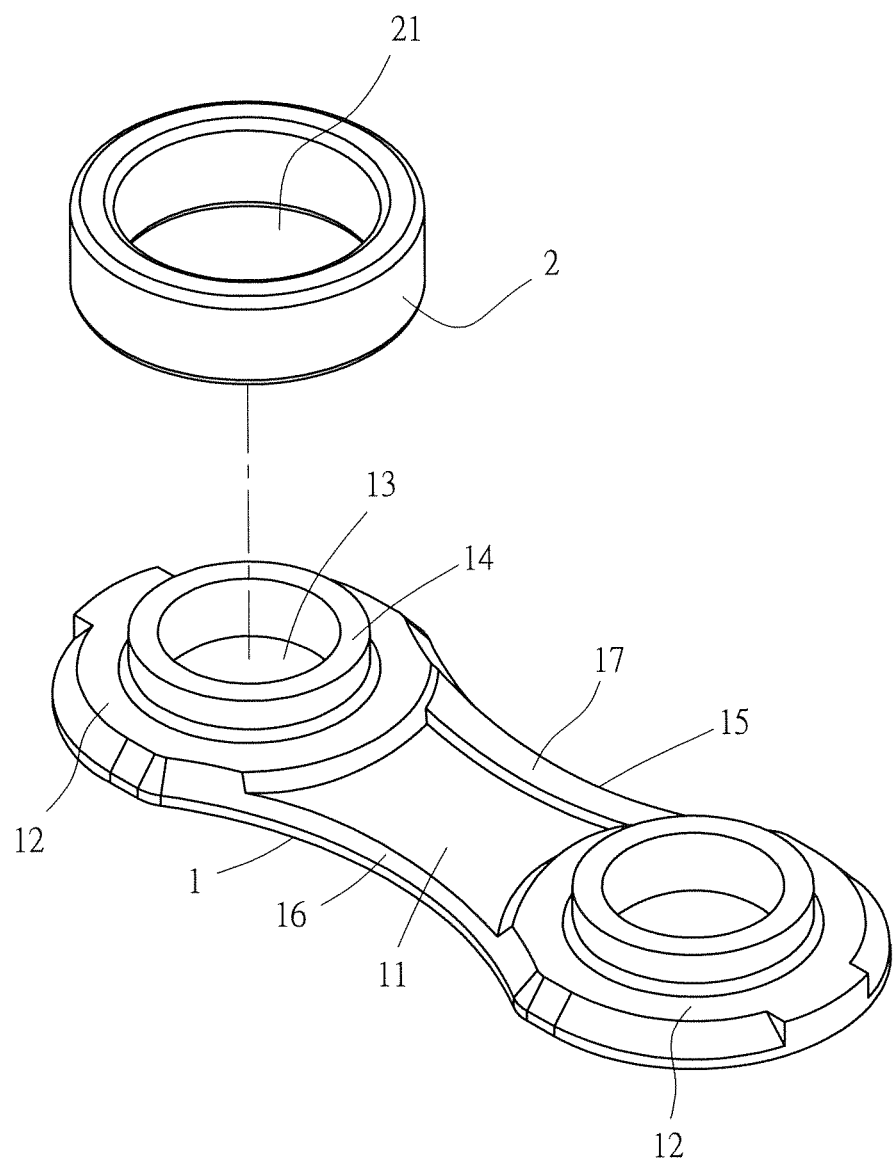
FIG. 1 is an exploded view of a first embodiment of the present invention.

Referring to FIG. 1, in a first embodiment of the present invention, a chain plate structure comprises a link plate body (1) and a sleeve (2).

The link plate body (1) has an acting surface (11) facing another link plate body (1). The link plate body (1) has two circular combining portions (12) formed at two opposite ends of the acting surface (11). The combining portion (12) is provided with a passing-through axial hole (13). The axial hole (13) is peripherally formed with a raised ring (14). The link plate body (1) has a first approach edge (15) and a second approach edge (16), both of which extend between the two combining portions (12) on the acting surface (11). The acting surface (11) is provided with a limiting block (17) adjacent to the first approach edge (15). The limiting block (17) has an altitude higher than that of the acting surface (11) and lower than that of the combining portions (12).

Figure 2:
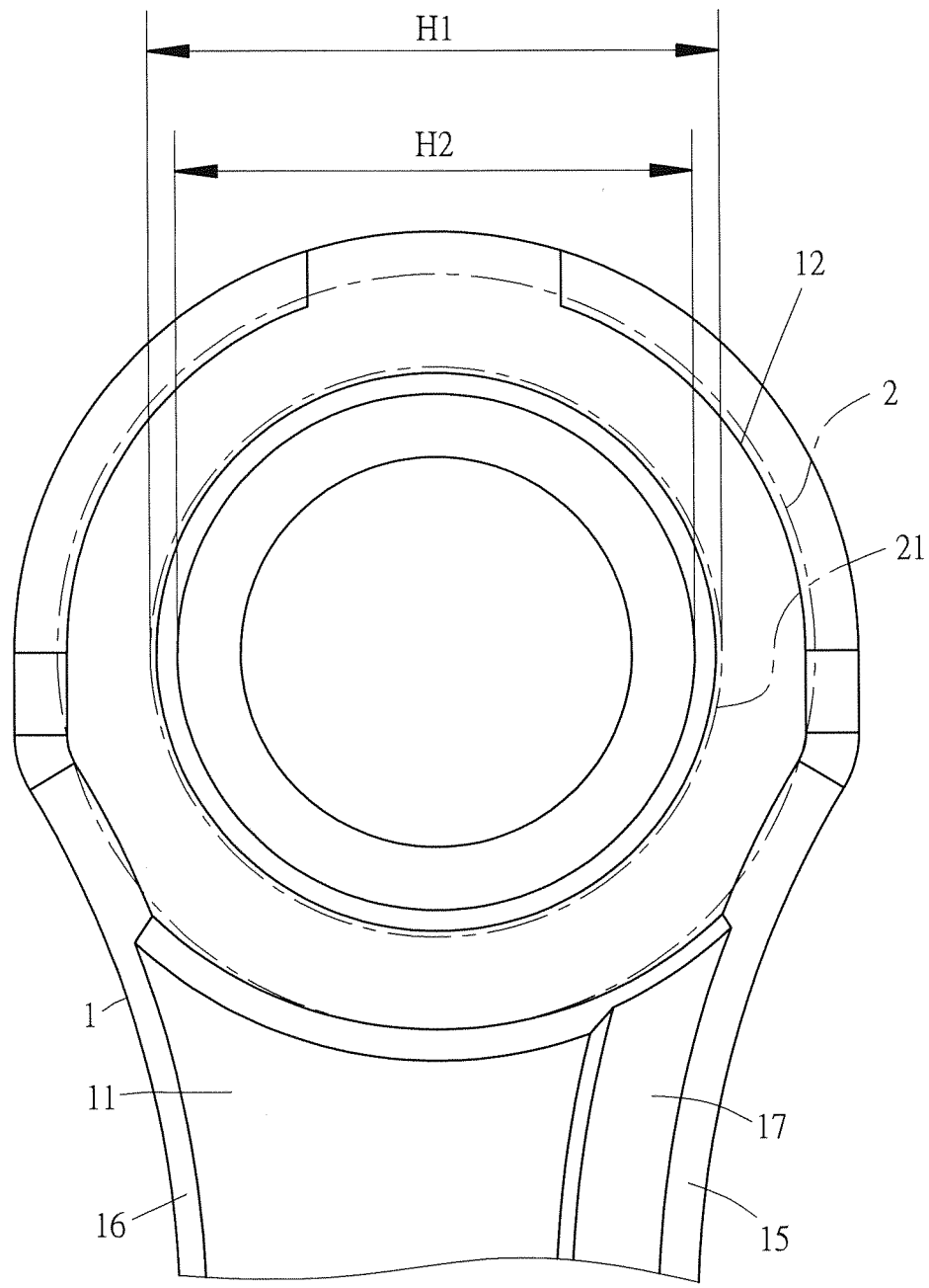
FIG. 2 is a partial cross-sectional view of the first embodiment of the present invention.

The sleeve (2) is mounted on the raised ring (14) of the link plate body (1). The sleeve (2) is provided with a through hole (21). The through hole (21) of the sleeve (2) has a maximum diameter (H1) greater than a maximum diameter (H2) of the raised ring (14) (as shown in FIG. 2).

Figure 3:
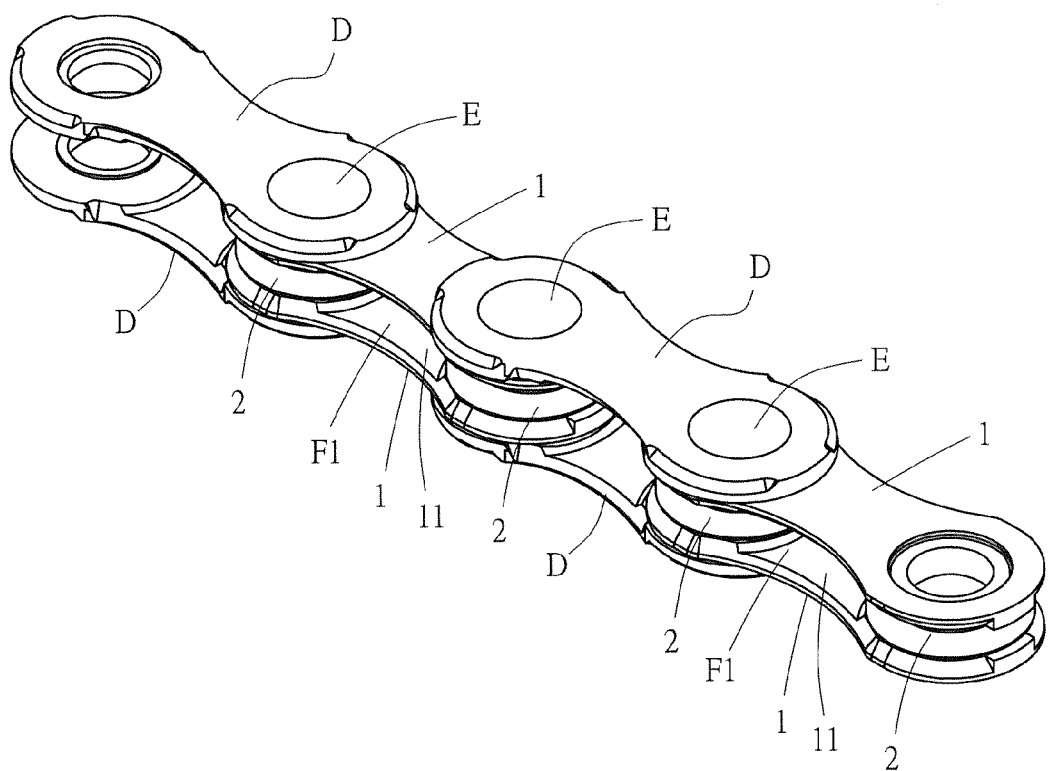
FIG. 3 is a perspective view showings the chain plate structures and the outer plates are combined into a chain according to the first embodiment of the present invention.

Referring to FIG. 1 and FIG. 3, according to the present embodiment, two of the link plate bodies (1) are used as inner plates to be assembled with two outer plates (D) for forming a chain element. During assembly, each of the two link plate bodies (1) has its corresponding sleeve (2) mounted thereon, by inserting one of its raised rings (14) into the through hole (21) of the corresponding sleeve (2). It is noted that since the maximum diameter (H1) of the through hole (21) of the sleeve (2) is greater than the maximum diameter (H2) of the raised ring (14), the sleeve (2) is allowed to move within a restricted range on the combining portion (12) after being mounted on the link plate body (1). Then one of the two link plate bodies (1) is combined with the other to form as a set of combined link plate bodies (1) and, subsequently, the set of combined link plate bodies (1) is sandwiched by a pair of mutually facing outer plates (D). Afterward, a chain pin (E) is provided to combine the set of link plate bodies (1) and the pair of outer plates (D) into a chain element, and more such chain elements can form a chain. In the assembled chain element, a first space (F1) is defined between the two opposite acting surfaces (11) of the aligned link plate bodies (1). The first space (F1) is configured to receive a chain-engaging tooth (B1) of a guide pulley (B) and a chain-engaging tooth (C1) of a transmission sprocket (C) during transmission and shifting operation (as shown in FIG. 4).

Figure 4:
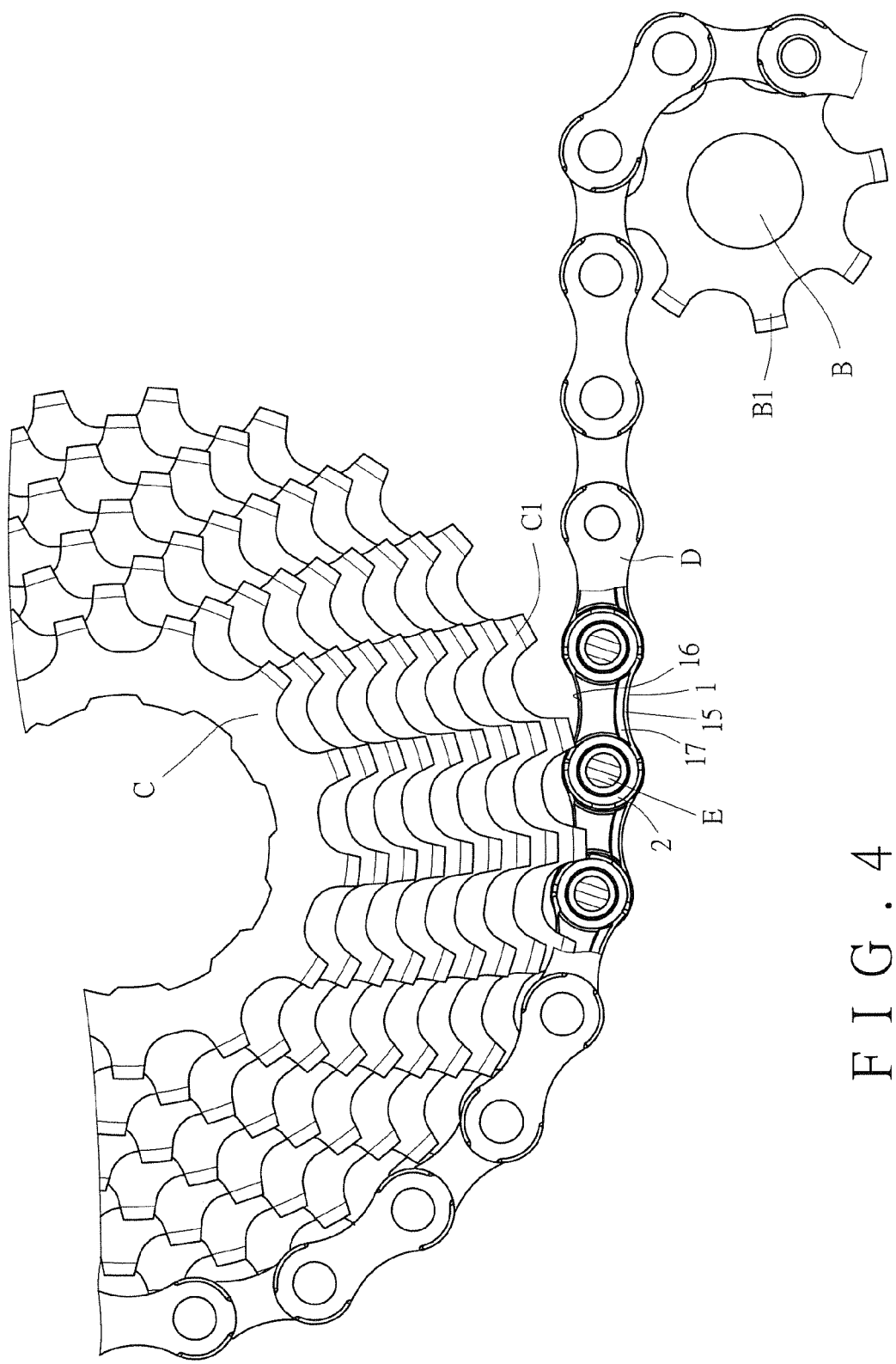
FIG. 4 shows the chain composed of the chain plate structures of the first embodiment of the present invention engaging with a guide pulley and a transmission sprocket.
Figure 5:
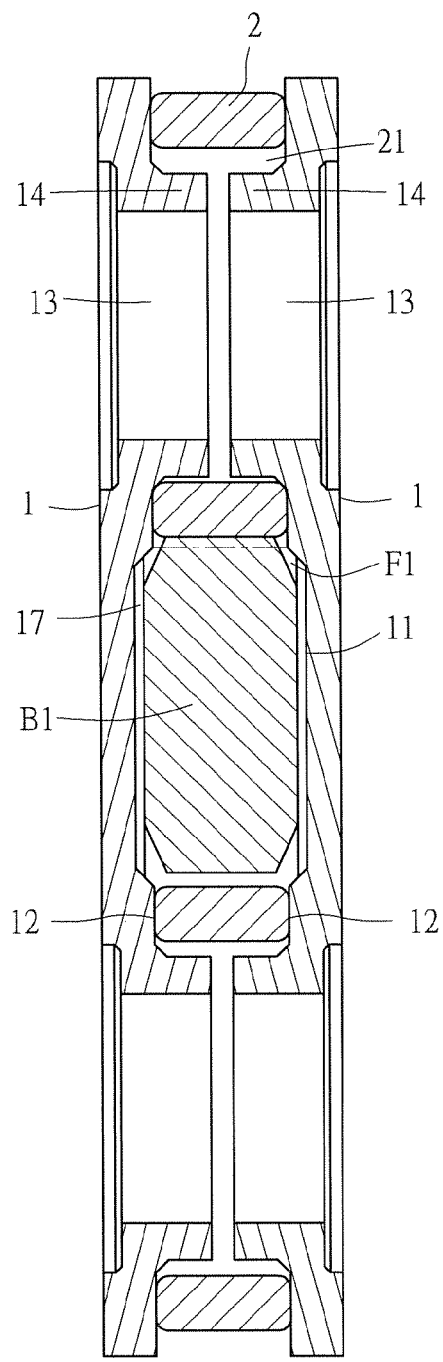
FIG. 5 shows a chain-engaging tooth of the guide pulley of the first embodiment of the present invention engaged in the first space.

In use of the chain, as shown in FIG. 4 and FIG. 5, the chain-engaging tooth (B1) of the guide pulley (B), which is generally thinner than the chain-engaging tooth (C1) of the transmission sprocket (C), enters the first space (F1) from the two opposite first approach edges (15) of the aligned link plate bodies (1). Therefore, thanks to the limiting blocks (17) adjacent to the two opposite first approach edges (15), the first space (F1) between the two opposite acting surfaces (11) of the aligned link plate bodies (1) is relatively narrowed and can fit the relatively thin chain-engaging teeth (B1) of the guide pulley (B), allowing the chain-engaging tooth (B1) of the guide pulley (B) to move and get engaged therein fast and smoothly. As the chain-engaging tooth (B1) is fittingly received by the corresponding first space (F1), the fast displacement of the guide pulley (B) and thereby the smooth shifting operation are ensured.

Figure 6:
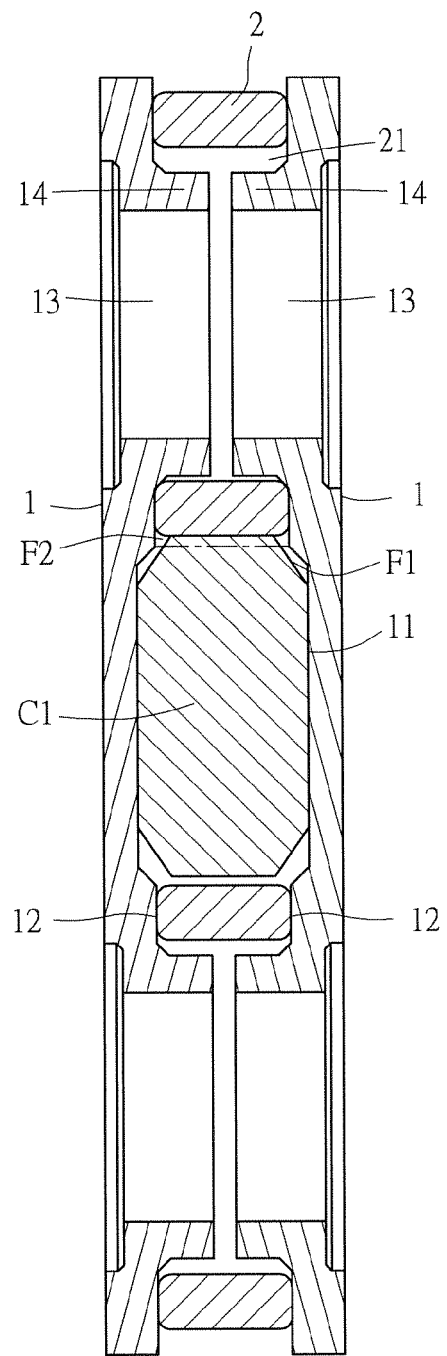
FIG. 6 shows a chain-engaging tooth of the transmission sprocket of the first embodiment of the present invention engaged in the first space.
Figure 7:
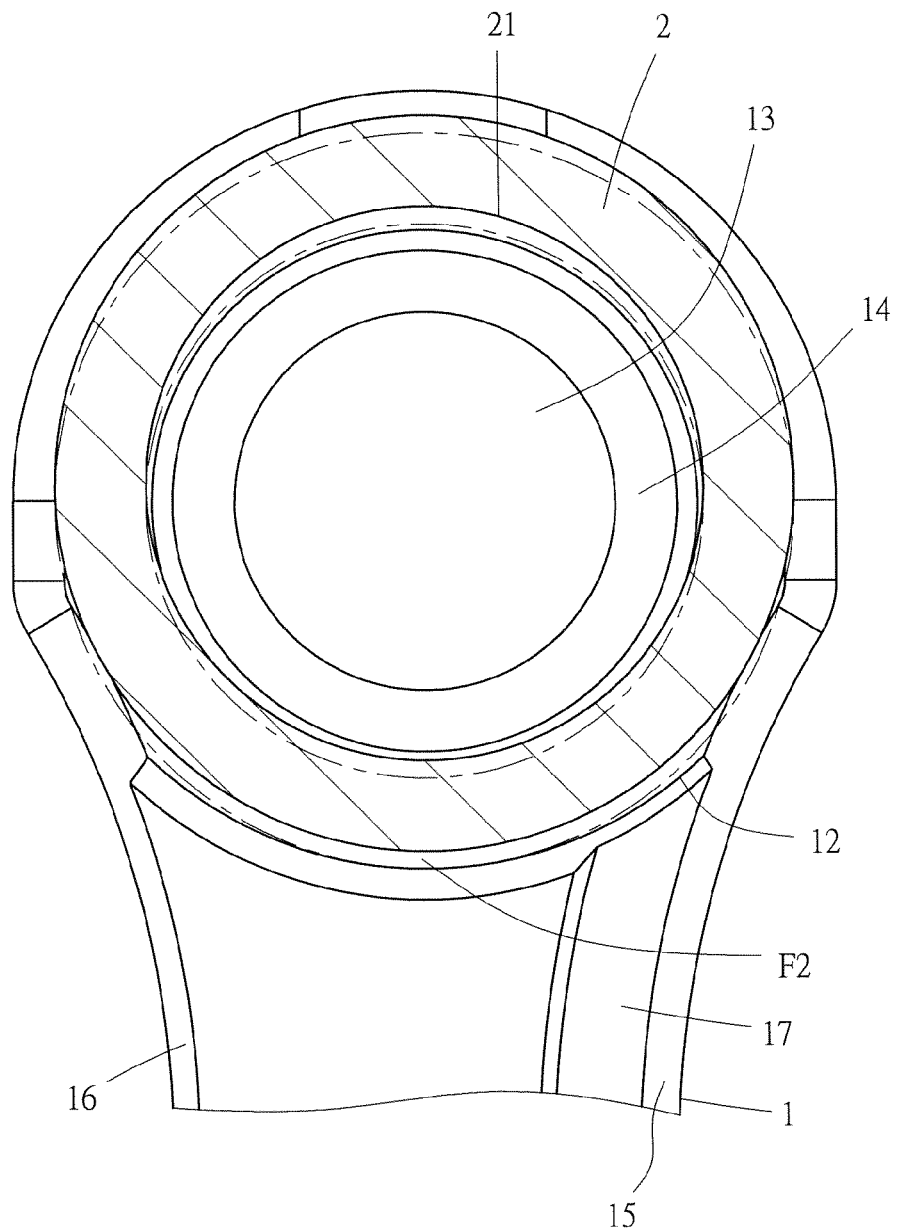
FIG. 7 illustrates a second space formed when the sleeve of the first embodiment of the present invention displaces on the combining portion.

In addition, referring to FIG. 4 and FIG. 6, the chain-engaging tooth (C1) of the transmission sprocket (C), which is generally thicker than the chain-engaging tooth (B1) of the guide pulley (B), enters the first space (F1) from the two opposite second approach edges (16) of the aligned link plate bodies (1). Without the limiting block (17), the first space (F1) formed between the two opposite acting surfaces (11) of the aligned link plate bodies (1) is not narrowed, so that the relatively thick chain-engaging tooth (C1) of the transmission sprocket (C) can move and get engaged therein fast and smoothly. As the chain-engaging tooth (C1) is fittingly received by the corresponding first space (F1), the fast displacement of the chain and thereby the smooth shifting operation are ensured. Moreover, when the chain reverses, the first space (F1) is large enough to receive the chain-engaging tooth (C1) of the transmission sprocket (C), so the chain is secured from coming off. When is held by the first space (F1) between the two opposite acting surfaces (11), the chain-engaging tooth (C1) presses against and displaces one of the selves (2) mounted between the two aligned link plate bodies (1) (as shown in FIG. 7). The displacement of the sleeves (2) leaves a second space (F2), which is narrower than the first space (F1), between the two opposite combining portions (12) of the aligned link plate bodies (1). Thus, the tip of the chain-engaging tooth (C1) can be fittingly received in the second space (F2), so that when the chain moves for shifting operation, it is prevented from deviating from its intended moving orbit. Thereby, the chain will not sway transversely to hit the guide pulley (B) and generate noise.

Figure 8:
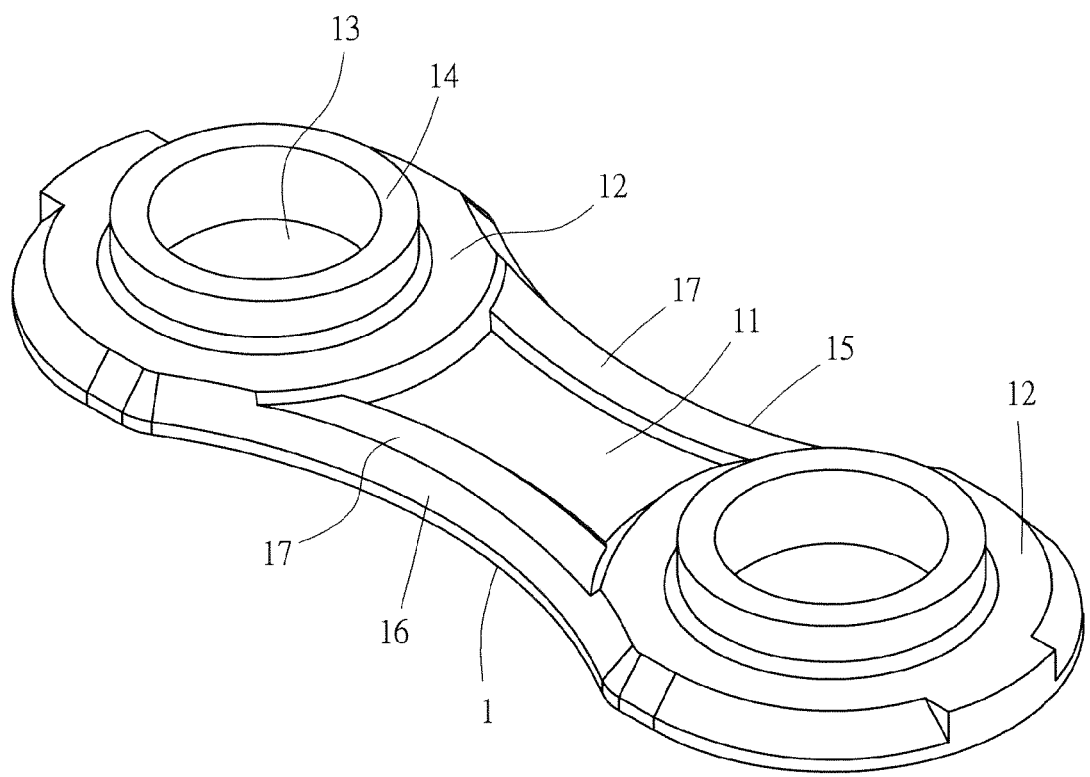
FIG. 8 is a perspective view of a link plate body according to a second embodiment of the present invention.

In a second embodiment of the present invention, as shown in FIG. 8, the link plate body (1) has an acting surface (11). The link plate body (1) has two circular combining portions (12) formed at two opposite ends of the acting surface (11). The combining portion (12) is provided with a passing-through axial hole (13). The axial hole (13) is peripherally formed with a raised ring (14). The link plate body (1) has a first approach edge (15) and a second approach edge (16), both of which extend between the two combining portions (12) on the acting surface (11). The acting surface (11) is provided with two limiting blocks (17), wherein one of the two limiting blocks (17) is adjacent to the first approach edge (15) while the other is adjacent to the second approach edge (16). The two limiting blocks (17) each have an altitude higher than that of the acting surface (11) and lower than that of the combining portions (12). With the foregoing configuration, the first and second spaces can be similarly formed between two aligned link plate bodies (1), thereby allowing steady and fast shifting operation with reduced noise.

Figure 9:
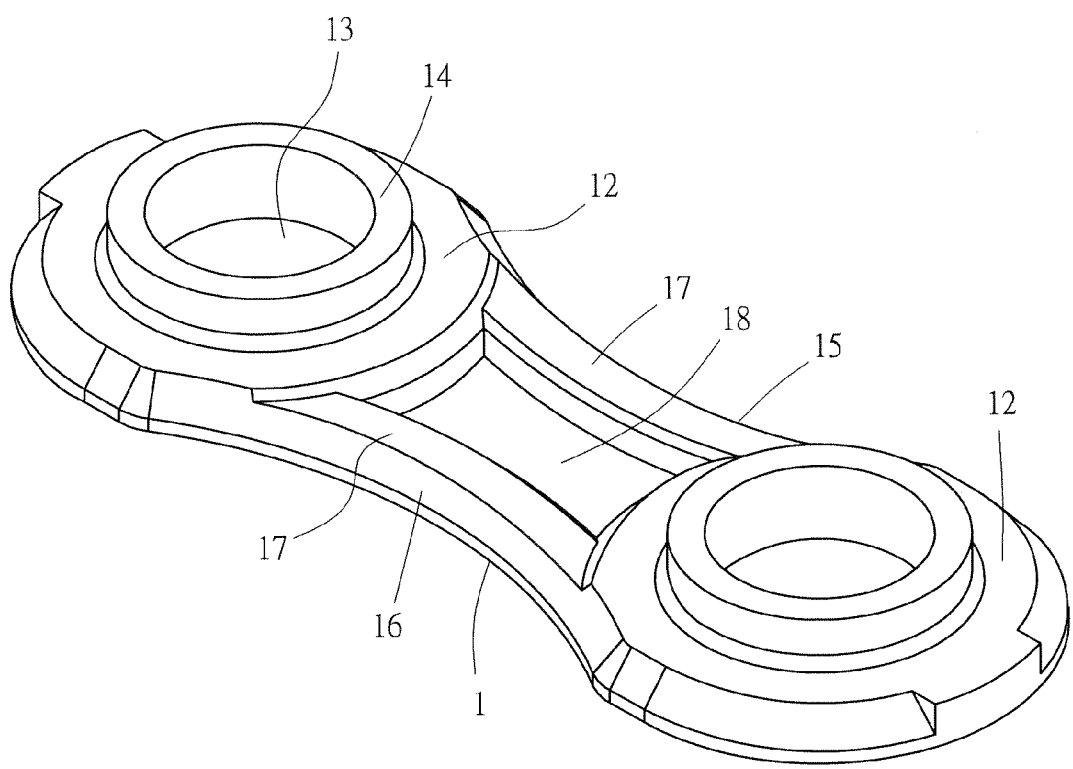
FIG. 9 is a perspective view of a link plate body according to a third embodiment of the present invention.

In a third embodiment of the present invention, as shown in FIG. 9, the link plate body (1) has an acting surface. The acting surface is provided with a passing-through hollowed-out portion (18). The hollowed-out portion (18) allows the chain-engaging tooth of the guide pulley or the chain-engaging tooth of the transmission sprocket to offset transversely during shifting operation, so as not to deviate and hit the acting surface of the link plate body (1). The link plate body (1) has two circular combining portions (12) formed at two opposite ends of the acting surface. The combining portion (12) is provided with a passing-through axial hole (13). The axial hole (13) is peripherally formed with a raised ring (14). The link plate body (1) has a first approach edge (15) and a second approach edge (16), both of which extend between the two combining portions (12) on the acting surface. The acting surface is provided with two limiting blocks (17), wherein one of the two limiting blocks (17) is adjacent to the first approach edge (15) while the other is adjacent to the second approach edge (16). The two limiting blocks (17) each have an altitude higher than that of the acting surface (11) and lower than that of the combining portions (12). With the foregoing configuration, the first and second spaces can be similarly formed between two aligned link plate bodies (1), thereby allowing steady and fast shifting operation with reduced noise.

Figure 10:
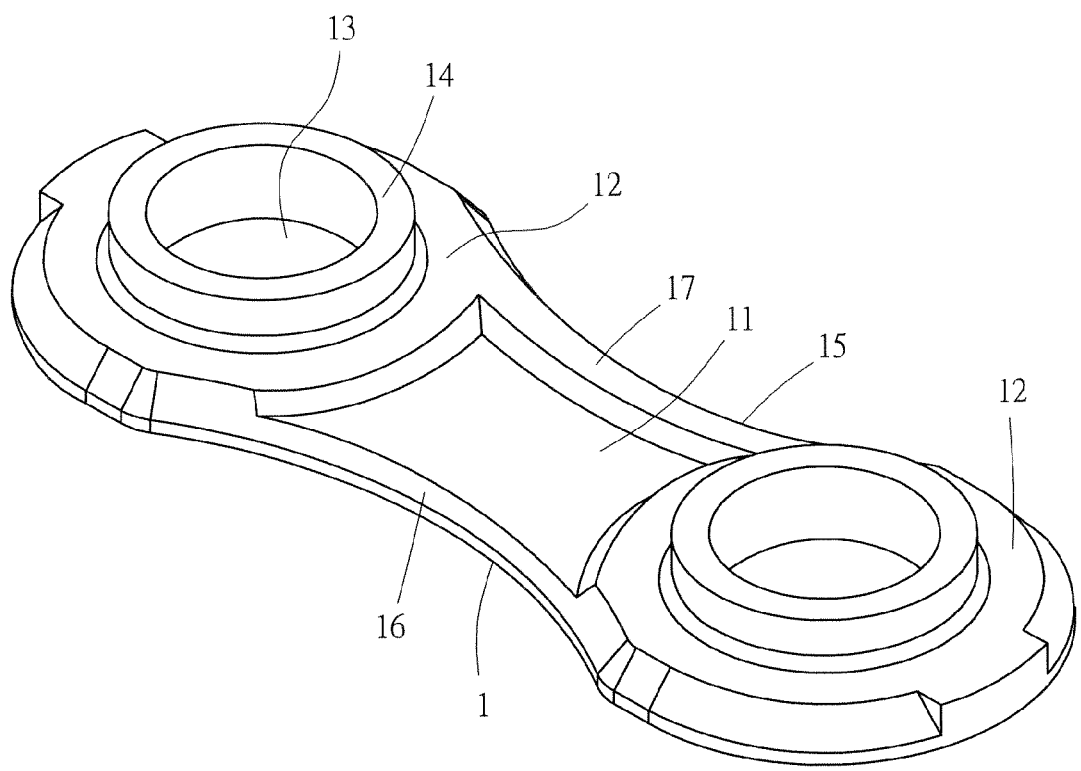
FIG. 10 is a perspective view of a link plate body according to a fourth embodiment of the present invention.

In a fourth embodiment of the present invention, as shown in FIG. 10, the link plate body (1) has an acting surface (11). The link plate body (1) has two circular combining portions (12) formed at two opposite ends of the acting surface (11). The combining portion (12) is provided with a passing-through axial hole (13). The axial hole (13) is peripherally formed with a raised ring (14). The link plate body (1) has a first approach edge (15) and a second approach edge (16), both of which extend between the two combining portions (12) on the acting surface (11). The acting surface (11) is provided with a limiting block (17) adjacent to the first approach edge (15). The limiting block (17) has an altitude higher than that of the acting surface (11) and equal to that of the combining portions (12). With the foregoing configuration, the first and second spaces can be similarly formed between two aligned link plate bodies (1), thereby allowing steady and fast shifting operation with reduced noise.

Figure 11:
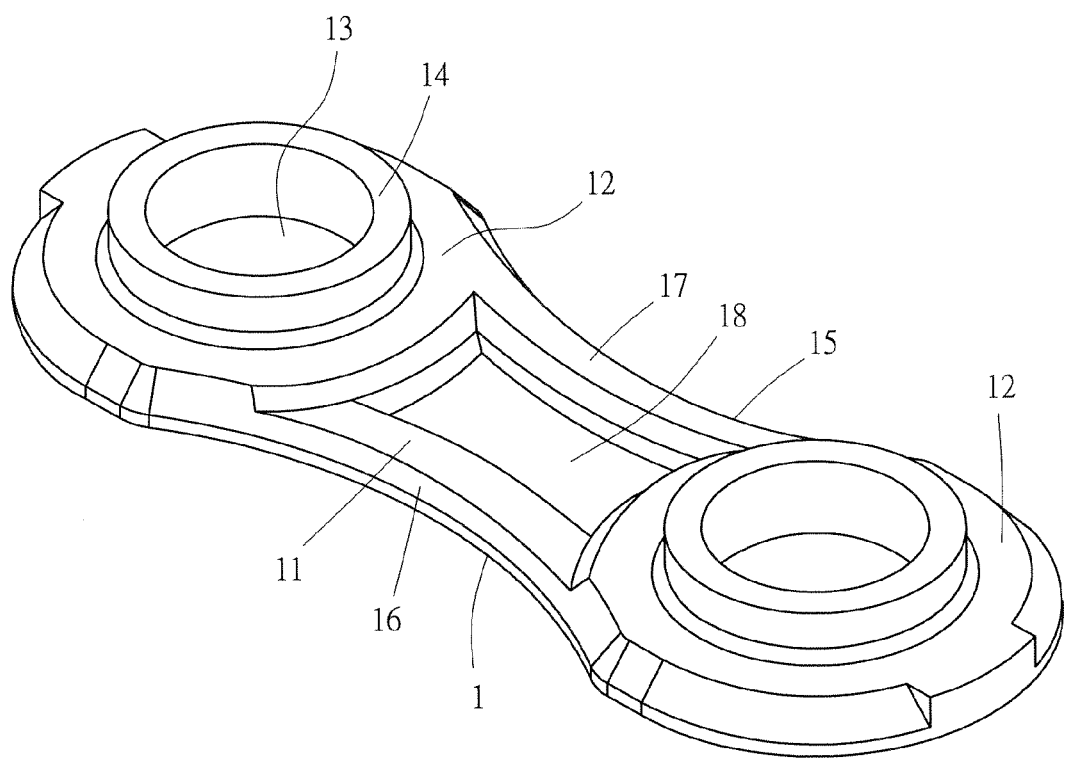
FIG. 11 is a perspective view of a link plate body according to a fifth embodiment of the present invention.

In a fifth embodiment of the present invention, as shown in FIG. 11, the link plate body (1) has an acting surface (11). The acting surface (11) has a passing-through hollowed-out portion (18). The hollowed-out portion (18) allows the chain-engaging tooth of the guide pulley or the chain-engaging tooth of the transmission sprocket to offset transversely during shifting operation, so as not to deviate and hit the acting surface (11) of the link plate body (1). The link plate body (1) has two circular combining portions (12) formed at two opposite ends of the acting surface (11). The combining portion (12) is provided with a passing-through axial hole (13). The axial hole (13) is peripherally formed with a raised ring (14). The link plate body (1) has a first approach edge (15) and a second approach edge (16), both of which extend between the two combining portions (12) on the acting surface (11). The acting surface (11) is provided with a limiting block (17) adjacent to the first approach edge (15). The limiting block (17) has an altitude higher than that of the acting surface (11) and equal to that of the combining portions (12). With the foregoing configuration, the first and second spaces can be similarly formed between two aligned link plate bodies (1), thereby allowing steady and fast shifting operation with reduced noise.

Figure 12:
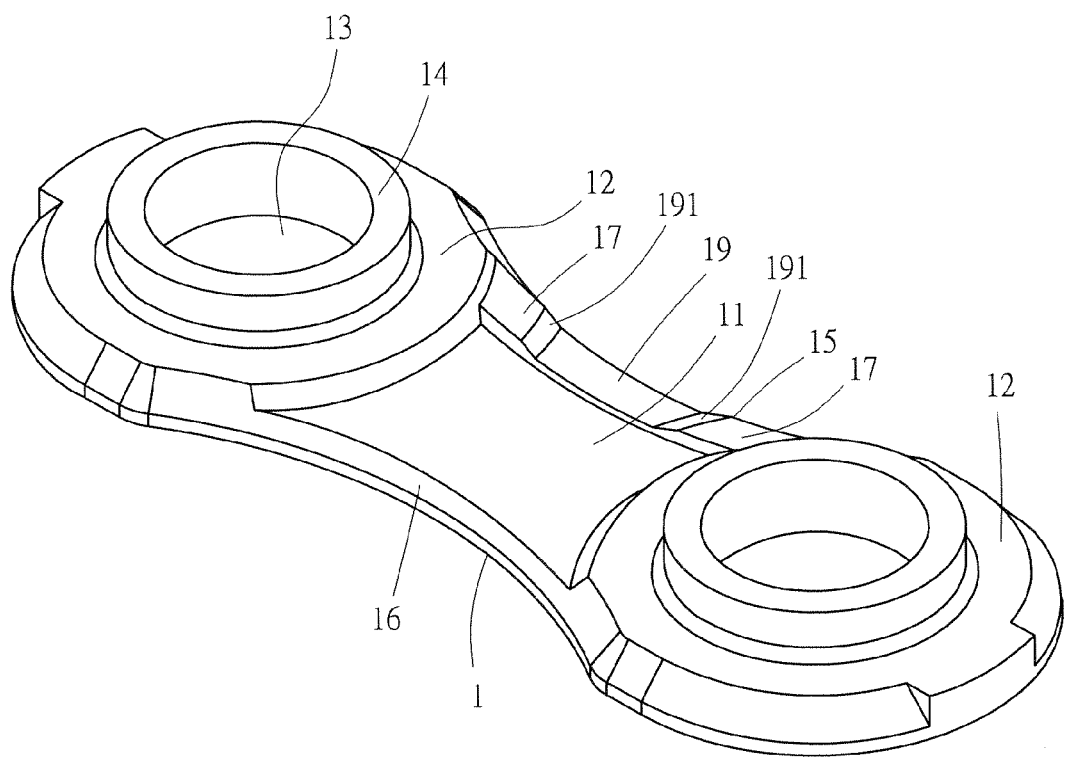
FIG. 12 is a perspective view of a link plate body according to a sixth embodiment of the present invention.

In a sixth embodiment of the present invention, as shown in FIG. 12, the link plate body (1) has an acting surface (11), The link plate body (1) has two circular combining portions (12) formed at two opposite ends of the acting surface (11), The combining portion (12) is provided with a passing-through axial hole (13). The axial hole (13) is peripherally formed with a raised ring (14). The link plate body (1) has a first approach edge (15) and a second approach edge (16), both of which extend between the two combining portions (12) on the acting surface (11). The acting surface has a limiting block (17) located beside the first approach edge (15). The limiting block (17) has an altitude higher than that of the acting surface (11) and lower than that of the combining portions (12). Moreover, the limiting block (17) is provided with a sunken portion (19) whose altitude is lower than that of the limiting block (17) and higher than that of the acting surface (11). The sunken portion (19) has two opposite ends each being provided with a ramp (191). Each of the ramps (191) extends between the sunken portion (19) and the limiting block (17) and inclines toward the center of the sunken portion (19). Thereby, the sunken portion (19) can guide the chain-engaging tooth to be engaged smoothly.

Figure 13:
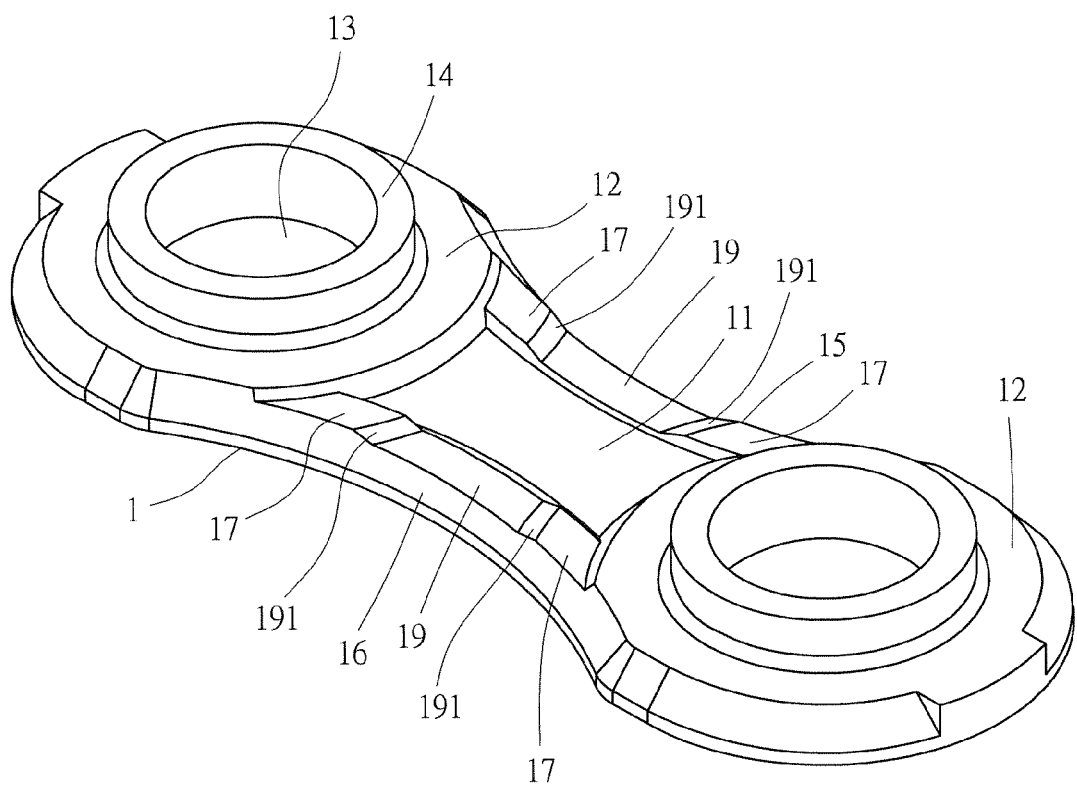
FIG. 13 is a perspective view of a link plate body according to a seventh embodiment of the present invention.

In a seventh embodiment of the present invention, as shown in FIG. 13, the link plate body (1) has an acting surface (11). The link plate body (1) has two circular combining portions (12) formed at two opposite ends of the acting surface (11). The combining portion (12) is provided with a passing-through axial hole (13). The axial hole (13) is peripherally formed with a raised ring (14). The link plate body (1) has a first approach edge (15) and a second approach edge (16), both of which extend between the two combining portions (12) on the acting surface (11). The acting surface (11) is provided with two limiting blocks (17), wherein one of the two limiting blocks (17) is adjacent to the first approach edge (15) while the other is adjacent to the second approach edge (16). The two limiting blocks (17) each have an altitude higher than that of the acting surface (11) and lower than that of the combining portions (12). Each of the two limiting blocks (17) is provided with a sunken portion (19). The two sunken portions (19) each have an altitude lower than that of the limiting blocks (17) and higher than that of the acting surface (11), and each have two ends each being provided with a ramp (191). Each of the ramps (191) extends between the corresponding sunken portion (19) and the corresponding limiting block (17) and inclines toward the center of the corresponding sunken portion (19). Thereby, the two opposite sunken portions (19) can guide the chain-engaging tooth to be engaged smoothly.

Figure 14:
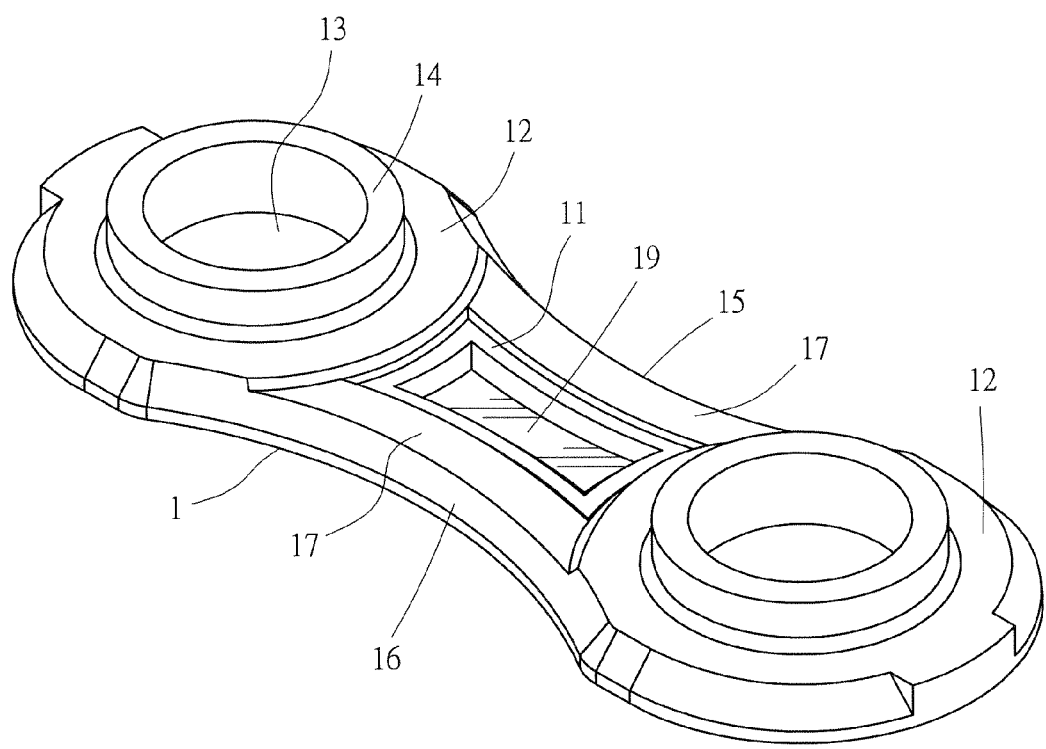
FIG. 14 is a perspective view of a link plate body according to an eighth embodiment of the present invention.
Figure 15:
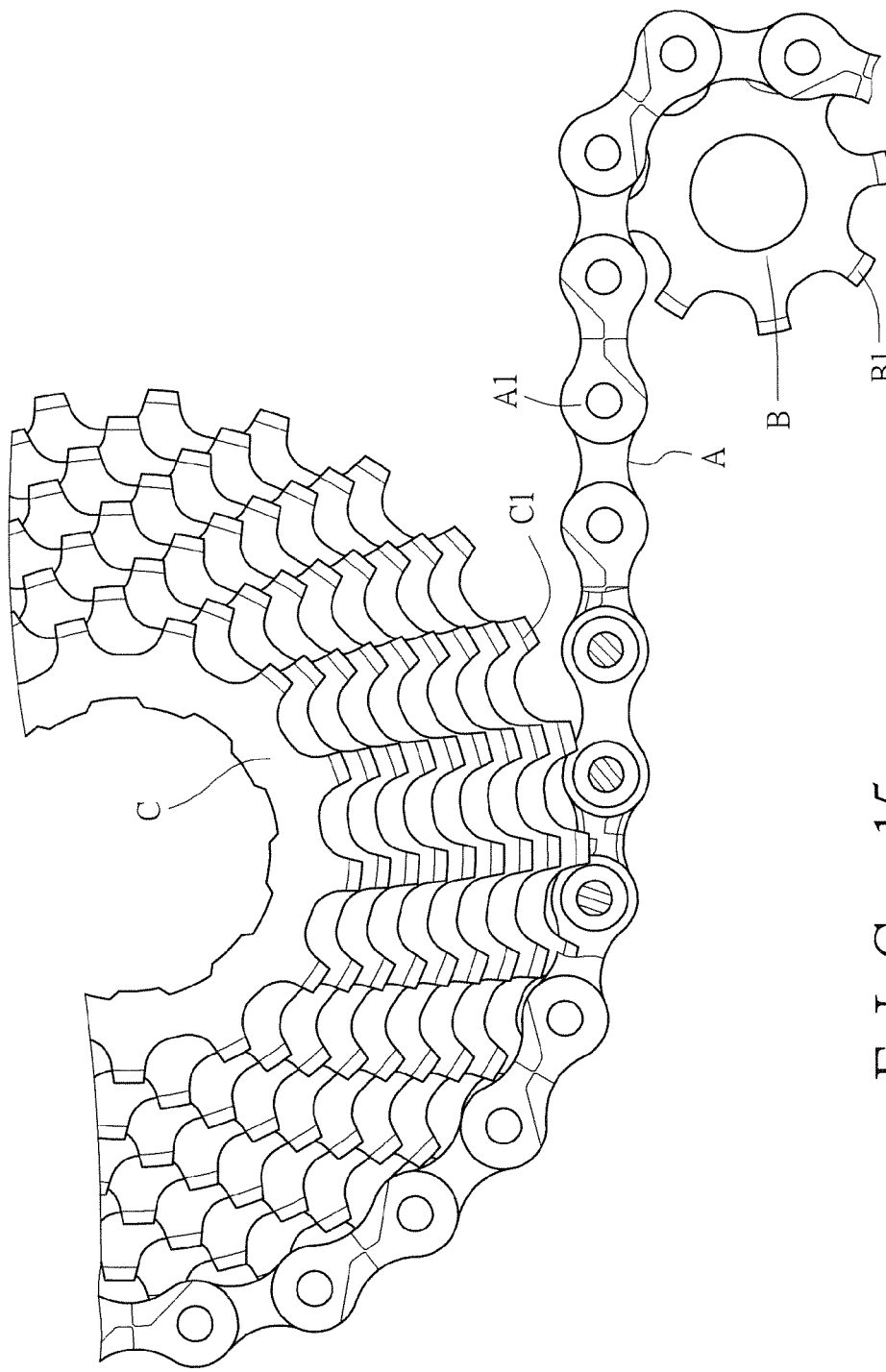
FIG. 15 depicts the conventional chain engaging with a guide pulley and a transmission sprocket.

In an eighth embodiment of the present invention, as shown in FIG. 14, the link plate body (1) has an acting surface (11). The acting surface (11) includes a depressed portion (19). The depressed portion (19) allows the chain-engaging tooth of the guide pulley or the chain-engaging tooth of the transmission sprocket to offset transversely during shifting operation, so as not to deviate and hit the acting surface (11) of the link plate body (1). The link plate body (1) has two circular combining portions (12) formed at two opposite ends of the acting surface (11). The combining portion (12) is provided with a passing-through axial hole (13). The axial hole (13) is peripherally formed with a raised ring (14). The link plate body (1) has a first approach edge (15) and a second approach edge (16), both of which extend between the two combining portions (12) on the acting surface (11). The acting surface (11) is provided with two limiting blocks (17), wherein one of the two limiting blocks (17) is adjacent to the first approach edge (15) while the other is adjacent to the second approach edge (16). The two limiting blocks (17) each have an altitude higher than that of the acting surface (11) and lower than that of the combining portions (12). With the foregoing configuration, the first and second spaces can be similarly formed between two aligned link plate bodies (1), thereby allowing steady and fast shifting operation with reduced noise.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A chain plate structure, comprising:
   a link plate body, having an acting surface, wherein two opposite ends of the acting surface each having a combining portion, each of the two combining portions is provided with an axial hole peripherally formed with a raised ring, the acting surface of the link plate body has a first approach edge and a second approach edge, the first approach edge and the second approach edge both extend between the two combining portions, the acting surface has a limiting block located adjacent to the first approach edge, and the limiting block has an altitude that is higher than an altitude of the acting surface; and
   a sleeve, being mounted on one of the raised rings of the link plate body, wherein the sleeve includes a through hole that has a maximum diameter greater than a maximum diameter of the raised rings,
   wherein when two of the link plate bodies are combined, a first space is formed between the acting surfaces of the two link plate bodies, and
   wherein the limiting block serves to limit the first space, while the sleeve is sufficiently movable on the corresponding one of the combining portions exposing a part of said combining portion so as to provide a second space.

2. The chain plate structure of claim 1, wherein the acting surface further has a limiting block located adjacent to the second approach edge.

3. The chain plate structure of claim 1, wherein the altitude of the limiting block is lower than an altitude of the combining portions.

4. The chain plate structure of claim 1, wherein the altitude of the limiting block is equal to an altitude of the combining portions.

5. The chain plate structure of claim 1, wherein the acting surface is provided with a hollowed-out portion that passes through the link plate body.

6. The chain plate structure of claim 1, wherein the acting surface is provided with a depressed portion.

7. The chain plate structure of claim 1, wherein the limiting block is provided with a sunken portion whose altitude is lower than the altitude of the limiting block and is higher than the altitude of the acting surface.

8. The chain plate structure of claim 7, wherein a ramp is formed at a border between the limiting block and the sunken portion and inclines toward a center of the sunken portion.

* * * * *